United States Patent
Campbell, Jr. et al.

(10) Patent No.: US 7,381,779 B2
(45) Date of Patent: Jun. 3, 2008

(54) SELF LIMITING CATALYST COMPOSITION WITH DICARBOXYLIC ACID ESTER INTERNAL DONOR AND PROPYLENE POLYMERIZATION PROCESS

(75) Inventors: Richard E. Campbell, Jr., Midland, MI (US); Linfeng Chen, Sugar Land, TX (US)

(73) Assignee: Dow Global Technologies Inc, Midland, MI (US)

( * ) Notice: Subject to any disclaimer, the term of this patent is extended or adjusted under 35 U.S.C. 154(b) by 0 days.

(21) Appl. No.: 10/568,931

(22) PCT Filed: Aug. 18, 2004

(86) PCT No.: PCT/US2004/026642

§ 371 (c)(1),
(2), (4) Date: Feb. 21, 2006

(87) PCT Pub. No.: WO2005/035595

PCT Pub. Date: Apr. 21, 2005

(65) Prior Publication Data

US 2007/0032375 A1 Feb. 8, 2007

Related U.S. Application Data

(60) Provisional application No. 60/505,314, filed on Sep. 23, 2003.

(51) Int. Cl.
C08F 4/642 (2006.01)

(52) U.S. Cl. .............. 526/125.3; 526/124.9; 526/125.6; 502/116; 502/127

(58) Field of Classification Search ........ 502/116, 502/127; 526/124.9, 125.3, 125.6
See application file for complete search history.

(56) References Cited

U.S. PATENT DOCUMENTS

| | | | |
|---|---|---|---|
| 4,107,413 A | 8/1978 | Giannini et al. |
| 4,115,319 A | 9/1978 | Scata et al. |
| 4,220,554 A | 9/1980 | Scata et al. |
| 4,294,721 A | 10/1981 | Cecchin et al. |
| 4,330,649 A | 5/1982 | Kioka et al. |
| 4,439,540 A | 3/1984 | Cecchin et al. |
| 4,442,276 A | 4/1984 | Kashiwa et al. |
| 4,460,701 A | 7/1984 | Terano et al. |
| 4,472,521 A | 9/1984 | Band |
| 4,540,679 A | 9/1985 | Arzoumanidis et al. |
| 4,547,476 A | 10/1985 | Terano et al. |
| 4,548,915 A | 10/1985 | Goodall et al. |
| 4,562,173 A | 12/1985 | Terano et al. |
| 4,728,705 A | 3/1988 | Nestlerode et al. |
| 4,816,433 A | 3/1989 | Terano et al. |
| 4,829,037 A | 5/1989 | Terano et al. |
| 4,927,797 A | 5/1990 | Ewen |
| 4,990,479 A | 2/1991 | Ishimaru et al. |
| 5,028,671 A | 7/1991 | Kioka et al. |
| 5,034,361 A | 7/1991 | Job et al. |
| 5,066,737 A | 11/1991 | Job |
| 5,066,738 A | 11/1991 | Ewen |
| 5,077,357 A | 12/1991 | Job |
| 5,082,907 A | 1/1992 | Job |
| 5,100,981 A | 3/1992 | Schreck et al. |
| 5,106,806 A | 4/1992 | Job |
| 5,146,028 A | 9/1992 | Job |
| 5,151,399 A | 9/1992 | Job |
| 5,153,158 A | 10/1992 | Kioka et al. |
| 5,192,732 A | 3/1993 | Duranel et al. |
| 5,229,342 A | 7/1993 | Job |
| 5,247,031 A | 9/1993 | Kioka et al. |
| 5,247,032 A | 9/1993 | Kioka et al. |
| 5,414,063 A | 5/1995 | Seeger et al. |
| 5,432,244 A | 7/1995 | Rebhan |
| 5,652,303 A | 7/1997 | Ishimaru et al. |
| 5,844,046 A | 12/1998 | Ohgizawa et al. |
| 5,849,654 A | 12/1998 | Fushimi et al. |
| 5,869,418 A | 2/1999 | Iiskola et al. |
| 6,066,702 A | 5/2000 | Ro et al. |
| 6,087,459 A | 7/2000 | Miro et al. |
| 6,096,844 A | 8/2000 | Fushimi et al. |
| 6,111,039 A | 8/2000 | Miro et al. |
| 6,127,303 A | 10/2000 | Ebara et al. |
| 6,133,385 A | 10/2000 | Shamshoum et al. |
| 6,147,024 A | 11/2000 | Shamshoum et al. |
| 6,184,328 B1 | 2/2001 | Yanagihara et al. |
| 6,303,698 B1 | 10/2001 | Ushioda et al. |
| 6,337,377 B1 | 1/2002 | Ebara et al. |

FOREIGN PATENT DOCUMENTS

| | | |
|---|---|---|
| EP | 490451 | 6/1992 |
| JP | 61/203105 | 9/1986 |
| WO | WO 95/21203 | 8/1995 |
| WO | WO 99/20663 | 4/1999 |
| WO | WO 99/58585 | 11/1999 |

*Primary Examiner*—Caixia Lu
(74) *Attorney, Agent, or Firm*—Whyte Hirschboeck Dudek SC

(57) ABSTRACT

A catalyst composition for the polymerization of propylene comprising one or more Ziegler-Natta procatalyst compositions comprising one or more transition metal compounds and one or more esters of aromatic dicarboxylic acid internal electron donors; one or more aluminum containing cocatalysts; and a mixture of two or more different selectivity control agents, said SCA mixture comprising from 1 to 99 percent of one or more esters of one or more aromatic monocarboxylic acids or substituted derivatives thereof, and from 99 to 1 percent of one or more alkoxysilane compounds.

16 Claims, No Drawings

US 7,381,779 B2

SELF LIMITING CATALYST COMPOSITION WITH DICARBOXYLIC ACID ESTER INTERNAL DONOR AND PROPYLENE POLYMERIZATION PROCESS

CROSS REFERENCE STATEMENT

This application claims the benefit of U.S. Provisional Application No. 60/505,314, filed Sep. 23, 2003.

BACKGROUND OF THE INVENTION

The present invention relates to stereoselective Ziegler-Natta catalyst compositions for use in the polymerization of propylene having improved control over polymerization activity and reactor process continuity through the use of carefully chosen mixtures of selectivity control agents. Ziegler-Natta propylene polymerization catalyst compositions are well known in the art. Typically, these compositions include a transition metal compound, especially a mixed titanium, magnesium and halide containing compound in combination with an internal electron donor (referred to as a procatalyst); a co-catalyst, usually an organoaluminum compound; and a selectivity control agent (SCA). Examples of such Ziegler-Natta catalyst compositions are shown in: U.S. Pat. Nos. 4,107,413; 4,115,319; 4,220,554; 4,294,721; 4,330,649; 4,439,540; 4,442,276; 4,460,701; 4,472,521; 4,540,679; 4,547,476; 4,548,915; 4,562,173; 4,728,705; 4,816,433; 4,829,037; 4,927,797; 4,990,479; 5,028,671; 5,034,361; 5,066,737; 5,066,738; 5,077,357; 5,082,907; 5,106,806; 5,146,028; 5,151,399; 5,153,158; 5,229,342; 5,247,031; 5,247,032 and 5,432,244.

Catalyst compositions designed primarily for the polymerization of propylene or mixtures of propylene and ethylene generally include a selectivity control agent in order to affect polymer properties, especially tacticity or stereoregularity of the polymer backbone. As one indication of the level of tacticity, especially the isotacticity of polypropylene, the quantity of such polymer that is soluble in xylene or similar liquid that is a non-solvent for the tactic polymer is often used. The quantity of polymer that is soluble in xylene is referred to as xylene solubles content or XS. In addition to tacticity control, molecular weight distribution (MWD), melt flow (MF), and other properties of the resulting polymer are affected by use of a SCA as well. It has also been observed that the activity of the catalyst composition as a function of temperature may be affected by the choice of SCA. Often however, a SCA which gives desirable control over one polymer property, is ineffective or detrimental with respect to additional properties or features. Conversely, an SCA that is effective in combination with one procatalyst may not be effective when used in combination with a different procatalyst.

With regard to the temperature dependence of catalyst activity, it is known that the use of certain aromatic carboxylic acid esters, especially ethyl p-ethoxybenzoate (PEEB), in combination with a Ziegler-Natta procatalyst composition containing an ester of an aromatic monocarboxylic acid, exemplified by ethyl benzoate, results in an inherently self-extinguishing catalyst composition with respect to temperature. That is, such compositions are less active at moderately elevated polymerization temperatures, especially temperatures from about 80 to 130° C. Using such compositions, less reactor fouling or sheeting is observed, and run-away reactors due to increased polymerization rates at elevated temperatures, are largely eliminated. Disadvantageously, such catalyst compositions employing aromatic carboxylic acid esters, exemplified by PEEB, tend to possess lower overall polymerization activity and result in the production of polymers having relatively low isotacticities and increased oligomer contents, all of which are generally undesired results. Interestingly, the combination of PEEB with a procatalyst containing a dialkyl ester of an aromatic dicarboxylic acid, such as diisobutylphthalate (DIBP) as an internal electron donor generally results in poor polymerization activity and production of polypropylene polymers having low isotacticity (high XS).

In contrast, alkoxysilane SCA's, exemplified by dicyclopentyldimethoxysilane (DCPDMS), methylcyclohexyldimethoxysilane (MCbDMS) and n-propyltrimethoxysilane (NPTMS) generally form isotactic polymers having improved physical properties, when used in combination with an dialkyl ester of an aromatic dicarboxylic acid, such as DIBP, as an internal electron donor. Disadvantageously however, these catalyst compositions are not generally self-extinguishing, thereby resulting in polymerization process control problems, especially sheeting and formation of large polymer chunks due to hard to control temperature excursions allowing polymer particles to form agglomerates. For example, the polymerization activity of a typical catalyst composition containing DIBP as internal electron donor with DCPDMS as SCA generally increases as polymerization temperatures rise, especially at temperatures from 67 to 100° C.

Use of mixtures of SCA's in order to adjust polymer properties is known. Examples of prior art disclosures of catalyst compositions making use of mixed SCA's, especially mixtures of silane or alkoxysilane SCA's include: U.S. Pat. Nos. 5,100,981, 5,192,732, 5,414,063, 5,432,244, 5,652,303, 5,844,046, 5,849,654, 5,869,418, 6,066,702, 6,087,459, 6,096,844, 6,111,039, 6,127,303, 6,133,385, 6,147,024, 6,184,328, 6,303,698, 6,337,377, WO 95/21203, WO 99/20663, and WO 99/58585. References generally showing mixtures of silanes with monocarboxylic acid ester internal electron donors or other SCA's include: U.S. Pat. Nos. 5,432,244, 5,414,063, JP61/203,105, and EP-A-490, 451.

Despite the advances occasioned by the foregoing disclosures, there remains a need in the art to provide an aromatic dicarboxylic acid ester internal electron donor containing Ziegler-Natta catalyst composition for the polymerization of olefins, wherein the catalyst composition retains the advantages of alkoxysilane SCA containing catalyst compositions with regard to polymer properties but additionally possesses improved temperature/activity properties. Especially desired are such compositions that are inherently self-extinguishing with regard to catalyst activity as a function of temperature, thereby leading to reduced polymer agglomerate formation and improved polymerization process control.

SUMMARY OF THE INVENTION

The present invention provides a catalyst composition for the polymerization of propylene or mixtures of propylene and one or more copolymerizable comonomers, said catalyst composition comprising one or more Ziegler-Natta procatalyst compositions comprising one or more transition metal compounds and one or more esters of aromatic dicarboxylic acid internal electron donors; one or more aluminum containing cocatalyts; and an SCA mixture of two or more different selectivity control agents, said SCA mixture comprising from 1 to 99 mol percent of one or more esters of one or more aromatic monocarboxylic acids or substituted derivatives thereof, and from 99 to 1 mol percent of one or more alkoxysilane compounds, said compounds and amounts being selected such that:

$$\frac{A_{T2}(\text{mixture})}{A_{T1}(\text{mixture})} < \frac{A_{T2}(\text{Si})}{A_{T1}(\text{Si})}$$

where $A^{T2}(\text{mixture})$ and $A_{T1}(\text{mixture})$ are normalized catalyst activities using the SCA mixture at temperatures T2 and T1, respectively; $A_{T2}(\text{Si})$ and $A_{T1}(\text{Si})$ are normalized catalyst activities using only the alkoxysilane SCA compound at temperatures T2 and T1, respectively; T1 is a normal polymerization temperature, preferably from 50 to 85° C., more preferably from 60 to 75° C., most preferably 67° C.; and T2 is a polymerization temperature higher than T1 possibly encountered during the polymerization under nonstandard polymerization conditions, preferably a temperature from 85 to 130° C., more preferably from 90 to 120° C., and most preferably 100° C.

The present invention also provides a method of polymerizing propylene or mixtures of propylene and one or more copolymerizable comonomers under polymerization conditions using the previously described Ziegler-Natta catalyst composition comprising said mixture of SCA's. More particularly, the process comprises contacting propylene or a mixture of propylene and one or more copolymerizable comonomers under polymerization conditions at a temperature from 40 to 130° C., preferably from 45 to 120° C., more preferably from 50 to 100° C., with a catalyst composition comprising one or more Ziegler-Natta procatalyst compositions comprising one or more transition metal compounds and one or more esters of aromatic dicarboxylic acid internal electron donors; one or more aluminum containing cocatalyts; and an SCA mixture of two or more different selectivity control agents, said SCA mixture comprising from 1 to 99 mol percent of one or more esters of one or more aromatic monocarboxylic acids or substituted derivatives thereof, and from 99 to 1 mol percent of one or more alkoxysilane compounds, said compounds and amounts being selected such that:

$$\frac{A_{T2}(\text{mixture})}{A_{T1}(\text{mixture})} < \frac{A_{T2}(\text{Si})}{A_{T1}(\text{Si})}$$

where $A_{T2}(\text{mixture})$ and $A_{T1}(\text{mixture})$ are normalized catalyst activities using the SCA mixture at temperatures T2 and T1, respectively; $A_{T2}(\text{Si})$ and $A_{T1}(\text{Si})$ are normalized catalyst activities using only the alkoxysilane SCA compound at temperatures T2 and T1, respectively; T1 is a normal polymerization temperature, preferably from 50 to 85° C., more preferably from 60 to 75° C., most preferably 67° C.; and T2 is a polymerization temperature higher than T1 possibly encountered during the polymerization under nonstandard polymerization conditions, preferably a temperature from 85 to 130° C., more preferably from 90 to 120° C., and most preferably 100° C.

Highly desirably, the polymerization is conducted under conditions of temperature and SCA content such that no substantial polymer agglomerates are formed in the polymer product and sheeting or fouling of the reactor surfaces is reduced, and preferably, eliminated.

Although a broad range of compounds are known generally as selectivity control agents, a particular catalyst composition may have a specific compound or group of compounds with which it is especially compatible. The present invention provides a catalyst composition for the polymerization of propylene or mixtures of propylene and one or more copolymerizable comonomers which is especially useful with Ziegler-Natta procatalyst compositions formed by halogenation of mixed alkoxide metal compounds. As a result of the present inventors discovery, it has been unexpectedly discovered that in the foregoing operating range of mixed SCA's the advantages of using an alkoxysilane in combination with an aromatic dicarboxylic acid ester internal electron donor can be largely retained while simultaneously improving the self-extinguishing properties of the polymerization catalyst. Outside of the foregoing ranges of components, this serendipitous result is not observed

DETAILED DESCRIPTION

If appearing herein, the term "comprising" and derivatives thereof is not intended to exclude the presence of any additional component, step or procedure, whether or not the same is disclosed herein. In order to avoid any doubt, all compositions claimed herein through use of the term "comprising" may include any additional additive, adjuvant, or compound, unless stated to the contrary. In contrast, the term, "consisting essentially of" if appearing herein, excludes from the scope of any succeeding recitation any other component, step or procedure, excepting those that are not essential to operability. The term "consisting of", if used, excludes any component, step or procedure not specifically delineated or listed. The term "or", unless stated otherwise, refers to the listed members individually as well as in any combination. The term "inert" means the substance or substituent is substantially non-interfering with any desired reaction or result disclosed herein.

Unless stated to the contrary or conventional in the art, all parts and percents used herein are based on weight. The term "(poly)alkyl-substituted" means optionally more than one alkyl substituent. The term "mixture" when used with respect to SCA's, means the use of two or more SCA components, simultaneously during at least a portion of a polymerization. The individual SCA's may be added separately to a reactor or premixed and added to the reactor in the form of the desired mixture. In addition, other components of the polymerization mixture, including the procatalyst, may be combined with one or more of the SCA's of the mixture, and/or the procatalyst, cocatalyst and a portion of the monomer optionally prepolymerized, prior to addition to the reactor.

The benefits of the invention are obtained by operation in a range of limited availability of alkoxysilane compound, such that desirable polymer properties exemplified by melt flow, molecular weight distribution, and/or xylene solubles content, especially MF, are largely retained while substantially reducing the polymerization activity of the catalyst composition at elevated reactor temperatures, especially reactor temperatures from 85 to 130° C., preferably from 100 to 120° C.

As a standardized measure of polymerization activity at elevated temperatures for use herein, catalyst activities are adjusted to compensate for different monomer concentrations due to temperature. For example, if liquid phase (slurry or solution) polymerization conditions are used, a correction factor to account for reduced propylene solubility in the reaction mixture at elevated temperatures is included. That is, the catalyst activity is "normalized" due to the decreased solubility compared to the lower temperature, especially a 67° C. standard. The "normalized" activity at temperature T°

C., or A, is defined as the measured activity (weight polymer/weight procatalyst) at T° C., multiplied, if required, by a concentration correction factor, [P(67)]/[P(T)], where [P(67)] is the propylene concentration at 67° C. and [P(T)] is the propylene concentration at the temperature of interest. It is understood that activities also are based on use of equivalent molar ratios (SCA/transition metal in procatalyst and Al/SCA) for the various SCA's and SCA mixtures tested. The correction factor assumes that polymerization activity increases linearly with propylene concentration under the conditions employed. The correction factor is a function of the solvent or diluent used. For example, the empirically derived propylene correction factors at 85° C., 100° C., 115° C., 130° C. and 145° C. for a common $C_{6-10}$ aliphatic hydrocarbon mixture (Isopar™ E, available from ExxonMobil Chemical Company) are 1.42, 1.93, 2.39, 2.98 and 3.70 respectively. Under gas phase polymerization conditions monomer solubility is normally not a factor and activity is generally uncorrected for temperature difference. That is, activity and normalized activity are the same.

It is to be understood that the present invention is not limited to the use of any particular polymerization conditions in practice. In fact, the invention is particularly beneficial when employed under gas phase polymerization conditions, in as much as control of reaction temperature and prevention of polymer agglomeration is especially critical in a gas phase polymerization.

Suitable alkoxysilanes for use in the mixture of SCA's herein are compounds having the general formula: $SiR_m(OR')_{4-m}$ (I) where R independently each occurrence is hydrogen or a hydrocarbyl or an amino group optionally substituted with one or more substituents containing one or more Group 14, 15, 16, or 17 heteroatoms, said R containing up to 20 atoms not counting hydrogen and halogen; R' is a $C_{1-20}$ alkyl group; and m is 0, 1, 2 or 3. Preferably, R is $C_{6-12}$ aryl, alkaryl or aralkyl, $C_{3-12}$ cycloalkyl, $C_{3-12}$ branched alkyl, or $C_{3-12}$ cyclic amino group, R' is $C_{1-4}$ alkyl, and m is 1 or 2. Examples of alkoxysilane selectivity control agents for use herein include: dicyclopentyldimethoxysilane, di-tert-butyldimethoxysilane, methylcyclohexyldimethoxysilane, ethylcyclohexyldimethoxysilane, diphenyldimethoxysilane, diisopropyldimethoxysilane, di-n-propyldimethoxysilane, diisobutyldimethoxysilane, di-n-butyldimethoxysilane, isobutylisopropyldimethoxysilane, cyclopentyltrimethoxysilane, isopropyltrimethoxysilane, n-propyltrimethoxysilane, n-propyltriethoxysilane, ethyltriethoxysilane, tetramethoxysilane, tetraethoxysilane, cyclopentylpyrrolidinodimethoxysilane, bis(pyrrolidino)dimethoxysilane, and bis(perhydroisoquinolino)dimethoxysilane. Preferred alkoxysilanes are dicyclopentyldimethoxysilane, methylcyclohexyldimethoxysilane, and n-propyltrimethoxysilane.

Suitable esters of aromatic monocarboxylic acids include $C_{1-10}$ alkyl or cycloalkyl esters of aromatic monocarboxylic acids containing from 7 to 100 carbon atoms in total. Suitable substituted derivatives thereof include compounds substituted both on the aromatic ring(s) or the ester group with one or more substituents containing one or more Group 14, 15 16, or 17 heteroatoms. Examples of such substituents include (poly)alkylether, cycloalkylether, arylether, aralkylether, alllylthioether, arylthioether, dialkylamine, diarylamine, diaralkylamine, and trialkylsilane groups. Preferred are $C_{1-20}$ hydrocarbyl esters of benzoic acid wherein the hydrocarbyl group is unsubstituted or substituted with one or more Group 14, 15 16, or 17 heteroatom containing substituents and $C_{1-20}$ (poly)hydrocarbyl ether derivatives thereof, more preferred are $C_{1-4}$ alkylbenzoates and $C_{1-4}$ ring alkylated derivatives thereof, especially, methyl benzoate, ethyl benzoate, propyl benzoate, methyl p-methoxybenzoate, methyl p-ethoxybenzoate, ethyl p-methoxybenzoate, and ethyl p-ethoxybenzoate, and most especially, ethyl benzoate and ethyl p-ethoxybenzoate.

An especially preferred combination of SCA components is a mixture of ethyl p-ethoxy-benzoate and an alkoxysilane selected from the group consisting of dicyclopentyldimethoxysilane, methylcyclohexyldimethoxysilane, and n-propyltrimethoxysilane.

Preferred SCA mixtures according to the invention are those comprising from 50 to 99 mol percent, more preferably from 80 to 99 mol percent, most preferably from 90 to 99 mol percent, and most highly preferably from 95 to 99 mol percent of one or more esters of one or more aromatic monocarboxylic acids or substituted derivatives thereof, and from 50 to 1 mol percent, more preferably from 20 to 1 mol percent, most preferably from 10 to 1 mol percent, and most highly preferably from 5 to 1 mol percent of one or more alkoxysilane compounds. Regardless of the foregoing range of components, it is to be understood by the skilled artisan that the normalized polymerization activity at an elevated temperature should be less than that obtainable at 67° C. and less than that obtainable if the alkoxysilane alone were employed in the same total SCA molar amount.

The total molar quantity of the SCA mixture employed in the present invention based on moles of transition metal is desirably from 1 to 500, more desirably from 5 to 100 and most preferably from 10 to 50.

Ziegler-Natta procatalysts for use in the present invention comprise a solid complex derived from a transition metal compound, for example, titanium-, zirconium-, chromium- or vanadium-hydrocarbyloxides, hydrocarbyls, halides, or mixtures thereof; and a Group 2 metal compound, especially a magnesium halide. Preferred precursors comprise a mixture of titanium halides supported on magnesium halide compounds.

Any of the conventional Ziegler-Natta, transition metal compound containing procatalysts can be used in the present invention. The procatalyst component of a conventional Ziegler-Natta catalyst preferably contains a transition metal compound of the general formula $TrX_x$, where Tr is the transition metal, X is a halogen or a $C_{1-10}$ hydrocarboxyl or hydrocarbyl group, and x is the number of such X groups in the compound in combination with the foregoing Group 2 metal compound. Preferably, Tr is a Group 4, 5 or 6 metal, more preferably a Group 4 metal, and most preferably titanium. Preferably, X is chloride, bromide, $C_{1-4}$ alkoxide or phenoxide, or a mixture thereof, more preferably chloride.

Illustrative examples of suitable transition metal compounds that may be used to form a Ziegler-Natta procatalyst are $TiC_4$, $ZrCl_4$, $TiBr_4$, $Ti(OC_2H_5)_3Cl$, $Zr(OC_2H_5)_3Cl$, $Ti(OC_2H_5)_3Br$, $Ti(OC_3H_7)_2Cl_2$, $Ti(OC_6H_5)_2Cl_2$, $Zr(OC_2H_5)_2Cl_2$, and $Ti(OC_2H_5)Cl_3$. Mixtures of such transition metal compounds may be used as well. No restriction on the number of transition metal compounds is made as long as at least one transition metal compound is present. A preferred transition metal compound is a titanium compound.

Examples of suitable Group 2 metal compounds include magnesium halides, dialkoxymagnesiums, alkoxymagnesium halides, magnesium oxyhalides, dialkylmagnesiums, magnesium oxide, magnesium hydroxide, and carboxylates of magnesium. A most preferred Group 2 metal compound is magnesium dichloride.

Highly desirably, the procatalysts employed in the invention are derived from magnesium compounds. Examples include anhydrous magnesium chloride, magnesium chloride adducts, magnesium dialkoxides or aryloxides, or carboxylated magnesium dialkoxides or aryloxides. Preferred compounds are magnesium di($C_{1-4}$)alkoxides, especially diethoxymagnesium. Additionally the procatalysts desirably comprise titanium moieties. Suitable sources of titanium moieties include titanium alkoxides, titanium aryloxides, and/or titanium halides. Preferred compounds used to prepare the procatalysts comprise one or more magnesium-di($C_{1-4}$)alkoxides, magnesium dihalides, magnesiumalkoxyhalides, or mixtures thereof and one or more titanium tetra($C_{14}$) alkoxides, titanium tetrahalides, titanium($C_{1-4}$) alkoxyhalides, or mixtures thereof.

Various methods of making precursor compounds used to prepare the present procatalysts are known in the art. These methods are described in U.S. Pat. Nos. 5,034,361; 5,082,907; 5,151,399; 5,229,342; 5,106,806; 5,146,028; 5,066,737; 5,077,357; 4,442,276; 4,540,679; 4,547,476; 4,460,701; 4,816,433; 4,829,037; 4,927,797; 4,990,479; 5,066,738; 5,028,671; 5,153,158; 5,247,031; 5,247,032; and elsewhere. In a preferred method, the preparation involves chlorination of the foregoing mixed magnesium compounds, titanium compounds, or mixtures thereof, and may involve the use of one or more compounds, referred to as "clipping agents", that aid in forming or solubilizing specific compositions via a solid/solid metathesis. Examples of suitable clipping agents include trialkylborates, especially triethylborate, phenolic compounds, especially cresol, and silanes.

A preferred precursor for use herein is a mixed magnesium/titanium compound of the formula $Mg_dTi(OR^e)_eX_f$ wherein $R^e$ is an aliphatic or aromatic hydrocarbon radical having 1 to 14 carbon atoms or COR' wherein R' is an aliphatic or aromatic hydrocarbon radical having 1 to 14 carbon atoms; each $OR^e$ group is the same or different; X is independently chlorine, bromine or iodine; d is 0.5 to 5, preferably 24, most preferably 3; e is 2-12, preferably 6-10, most preferably 8; and f is 1-10, preferably 1-3, most preferably 2. The precursors are ideally prepared by controlled precipitation through removal of an alcohol from the reaction mixture used in their preparation. An especially desirable reaction medium comprises a mixture of an aromatic liquid, especially a chlorinated aromatic compound, most especially chlorobenzene, with an alkanol, especially ethanol, and an inorganic chlorinating agent. Suitable inorganic chlorinating agents include chlorine derivatives of silicon, aluminum and titanium, especially titanium tetrachloride or titanium trichloride, most especially titanium tetrachloride. Removal of the alkanol from the solution used in the chlorination, results in precipitation of the solid precursor, having especially desirable morphology and surface area. Moreover, the resulting precursors are particularly uniform particle sized and resistant to particle crumbling as well as degradation of the resulting procatalyst.

The precursor is next converted to a solid procatalyst by further reaction (halogenation) with an inorganic halide compound, preferably a titanium halide compound, and incorporation of an internal electron donor. If not already incorporated into the precursor in sufficient quantity, the electron donor may be added separately before, during or after halogenation. This procedure may be repeated one or more times, optionally in the presence of additional additives or adjuvants, and the final solid product washed with an aliphatic solvent. Any method of making, recovering and storing the solid procatalyst is suitable for use in the present invention.

One suitable method for halogenation of the precursor is by reacting the precursor at an elevated temperature with a tetravalent titanium halide, optionally in the presence of a hydrocarbon or halohydrocarbon diluent. The preferred tetravalent titanium halide is titanium tetrachloride. The optional hydrocarbon or halohydrocarbon solvent employed in the production of olefin polymerization procatalyst preferably contains up to 12 carbon atoms inclusive, more preferably up to 9 carbon atoms inclusive. Exemplary hydrocarbons include pentane, octane, benzene, toluene, xylene, alkylbenzenes, and decahydronaphthalene. Exemplary aliphatic halohydrocarbons include methylene chloride, methylene bromide, chloroform, carbon tetrachloride, 1,2-dibromoethane, 1,1,2-trichloroethane, trichlorocyclohexane, dichlorofluoromethane and tetrachlorooctane. Exemplary aromatic halohydrocarbons include chlorobenzene, bromobenzene, dichlorobenzenes and chlorotoluenes. Of the aliphatic halohydrocarbons, compounds containing at least two chloride substituents are preferred, with carbon tetrachloride and 1,1,2-trichloroethane being most preferred. Of the aromatic halohydrocarbons, chlorobenzene and o-chlorotoluene are particularly preferred.

Preferred Ziegler-Natta procatalysts that may be used in the present invention are disclosed in U.S. Pat. Nos. 4,927,797; 4,816,433 and 4,839,321. In these patents, the procatalyst is described as comprising a solid catalyst component obtained by (i) suspending a dialkoxy magnesium in an aromatic hydrocarbon that is liquid at normal temperatures, (ii) contacting the dialkoxy magnesium with a titanium halide and further (iii) contacting the resulting composition a second time with the titanium halide, and contacting the dialkoxy magnesium with a diester of an aromatic dicarboxylic acid at some point during the treatment with the titanium halide in (ii).

Internal electron donors for use in the present catalyst composition to provide tacticity control and catalyst crystallite sizing are aromatic dicarboxylic acid esters or (poly)alkyl ether derivatives thereof, especially $C_{1-4}$ dialkyl esters of phthalic acid, or $C_{1-4}$ (poly)alkyl ether derivatives thereof.

The Ziegler-Natta, transition metal catalyst may also include an inert support material, if desired. The support should be an inert solid which does not adversely alter the catalytic performance of the transition metal compound. Examples include metal oxides, such as alumina, and metalloid oxides, such as silica.

Cocatalysts for use with the foregoing Ziegler-Natta catalysts according to the invention include organoaluminum compounds, such as trialkylaluminum-, dialkylaluminum hydride-, alkylaluminum dihydride-, dialkylaluminum halide-, alkylaluminumdihalide-, dialkylaluminum alkoxide-, and alkylaluminum dialkoxide- compounds containing from 1-20, preferably 1-6 carbon atoms in each alkyl- or alkoxide-group. Preferred cocatalytsts are $C_{1-4}$ triallylaluminum compounds, especially triethylaluminum (TEA). The quantity of cocatalyst employed may vary within wide limits but generally is employed in an amount from 1 to 100 moles per mole of transition metal compound in the procatalyst.

One suitable method of practicing a polymerization process according to the present invention comprises performing the following steps in any order or in any combination, or subcombination of individual steps:

a) providing a Ziegler-Natta catalyst composition to a polymerization reactor;

b) providing an organoaluminum cocatalyst compound to the polymerization reactor;

c) providing a mixture of SCA's meeting the foregoing requirements to the polymerization reactor;

d) providing one or more polymerizable monomers to the reactor; and e) extracting polymer product from the reactor.

In another suitable method of operation, the one or more esters of one or more aromatic monocarboxylic acids or substituted derivatives thereof may be added to the reactor intermittently as a means of controlling the polymerization activity in the reactor. In this method of operation, the reactor may be operated normally using only an alkoxysilane SCA and when conditions conducive to the formation of polymer agglomerates or a run away reaction are encountered, especially when polymerization temperatures exceed 80° C., more especially 100° C., the mixed SCA of the present invention may be formed in situ, by addition of the one or more esters of one or more aromatic monocarboxylic acids or substituted derivative thereof to the reactor contents for a time sufficient to reduce polymer agglomeration, sheeting, or fouling or to otherwise stabilize the polymerization.

In another suitable method of operation, the procatalyst is treated with the one or more esters of one or more aromatic monocarboxylic acids or substituted derivatives thereof (first SCA component) in the presence of the aluminum compound cocatalyst. The resulting composition may be stored and shipped prior to use or used directly in a polymerization reaction according to the invention by combining the same with one or more alkoxysilanes (second SCA component), optionally in combination with additional quantities of one or more monocarboxylic acid ester(s). In this embodiment, trialkylaluminum compounds are preferred cocatalysts. When used, this results in the procatalyst additionally comprising one or more esters of one or more aromatic monocarboxylic acids or substituted derivatives thereof and an aluminum alkyl compound and the catalyst composition is prepared by combining the same with one or more alkoxysilanes, optionally in combination with additional quantities of one or more monocarboxylic acid ester(s) and/or one or more cocatalysts.

In another suitable method of operation, the procatalyst may be treated with the alkoxysilane SCA component, optionally in the presence of an aluminum cocatalyst compound. The resulting composition may also be stored and shipped prior to use or used directly in a polymerization reaction according to the invention wherein only the alkyl ester SCA component is separately added, or optionally in combination with additional quantities of one or more alkoxysilane(s). In this embodiment as well, trialkylaluminum compounds are preferred cocatalysts.

The catalyst composition of the invention may be used in most all commercially known polymerization processes, including those incorporating a pre-polymerization step, whereby a small amount of monomer is contacted with the catalyst after the catalyst has been contacted with the co-catalyst and the selectivity control agent mixture or individual components thereof. Then, the resulting preactivated catalyst stream is introduced into the polymerization reaction zone and contacted with the remainder of the monomer to be polymerized, and optionally one or more of the SCA components. When used, this results in the procatalyst additionally comprising one or more alkoxysilane compounds and an aluminum alkyl compound and the catalyst composition is prepared by combining the same with one or more esters of one or more aromatic monocarboxylic acids or substituted derivatives thereof, optionally in combination with additional quantities of one or more alkoxysilane compounds and/or one or more cocatalysts. Suitably, the polymerization is conducted at temperatures from 40 to 130° C., more preferably from 50 to 100° C. The foregoing temperatures are average temperatures of the reaction mixture measured at the reactor walls. Isolated regions of the reactor may experience localized temperatures that exceed the foregoing limits.

Preferred polymerization processes in which the present invention is particularly suited include gas phase, slurry, and bulk polymerization processes, operating in one or more than one reactor. Suitable gas phase polymerization processes include the use of condensing mode as well as super condensing mode wherein gaseous components including added inert low boiling compounds are injected into the reactor in liquid form for purposes of heat removal. When multiple reactors are employed it is desirable that they operate in series, that is the effluent from the first reactor is charged to the second reactor and additional monomer or different monomer added to continue polymerization. Additional catalyst or catalyst components (that is procatalyst or cocatalyst) may be added, as well as additional quantities of the SCA mixture, another SCA mixture, or individual SCA's comprising the present SCA mixture. Highly desirably, the mixture of SCA's is added to only the first reactor of the series.

More preferably, the process of the invention is conducted in two reactors in which two olefins, most preferably, propylene and ethylene, are contacted to prepare a copolymer. In one such process, polypropylene is prepared in the first reactor and a copolymer of ethylene and propylene is prepared in the second reactor in the presence of the polypropylene prepared in the first reactor. Regardless of the polymerization technique employed, it is understood that the mixture of SCA's and the catalyst composition to be employed, or at least the procatalyst component thereof may be contacted in the absence of other polymerization components, especially monomer, prior to addition to the reactor. In a preferred embodiment, the polymerization process is a solution polymerization.

The following embodiments are provided as specific enablement for the appended claims.

1. A catalyst composition for the polymerization of propylene or mixtures of propylene and one or more copolymerizable comonomers, said catalyst composition comprising one or more Ziegler-Natta procatalyst compositions comprising one or more transition metal compounds and one or more esters of aromatic dicarboxylic acid internal electron donors; one or more aluminum containing cocatalyts; and an SCA mixture of two or more different selectivity control agents, said SCA mixture comprising from 1 to 99 mol percent of one or more esters of one or more aromatic monocarboxylic acids or substituted derivatives thereof, and from 99 to 1 mol percent of one or more alkoxysilane compounds, said compounds and amounts being selected such that:

$$\frac{A_{T2}(\text{mixture})}{A_{T1}(\text{mixture})} < \frac{A_{T2}(\text{Si})}{A_{T1}(\text{Si})}$$

where $A_{T2}(\text{mixture})$ and $A_{T1}(\text{mixture})$ are normalized catalyst activities using the SCA mixture at temperatures T2 and T1, respectively; $A_{T2}(\text{Si})$ and $A_{T1}(\text{Si})$ are normalized catalyst activities using only the alkoxysilane SCA compound at temperatures T2 and T1, respectively; T1 is a normal polymerization temperature from 50 to 85° C.; and T2 is a polymerization temperature higher than T1 possibly encountered during the polymerization under nonstandard polymerization conditions from 85 to 130° C.

2. A catalyst composition according to embodiment 1 wherein the total quantity of selectivity control agent employed is limited to provide a molar ratio, based on transition metal, from 1 to 500.

3. A catalyst composition according to embodiment 1 wherein the SCA mixture comprises from 80 to 99 percent of one or more alkyl esters of one or more aromatic monocarboxylic acids or substituted derivatives thereof, and from 20 to 1 percent of one or more alkoxysilane compounds 4. A catalyst composition according to embodiment 3 wherein the SCA mixture comprises from 90 to 99 percent of one or more esters of one or more aromatic monocarboxylic acids or substituted derivatives thereof, and from 10 to 1 percent of one or more alkoxysilane compounds.

5. A catalyst composition according to embodiment 1 wherein the alkoxysilane is selected from the group consisting of: dicyclopentyldimethoxysilane, di-tert-butyldimethoxysilane, methylcyclohexyldimethoxysilane, ethylcyclohexyldimethoxysilane, diphenyldimethoxysilane, diisopropyldimethoxysilane, di-n-propyldimethoxysilane, diisobutyldimethoxysilane, di-n-butyldimethoxysilane, isobutylisopropyldimethoxysilane, cyclopentyltrimethoxysilane, isopropyltrimethoxysilane, n-propyltrimethoxysilane, n-propyltriethoxysilane, ethyltriethoxysilane, tetramethoxysilane, tetraethoxysilane, cyclopentylpyrrolidinodimethoxysilane, bis(pyrrolidino)dimethoxysilane, and bis(perhydroisoquinolino)dimethoxysilane, and the ester of one or more aromatic monocarboxylic acids or substituted derivative thereof is selected from the group consisting of: methyl benzoate, ethyl benzoate, propyl benzoate, methyl p-methoxybenzoate, methyl p-ethoxybenzoate, ethyl p-methoxybenzoate, and ethyl p-ethoxybenzoate.

6. A catalyst composition according to any one of embodiments 1-6 wherein the selectivity control agent is a mixture of ethyl p-ethoxybenzoate and an alkoxysilane selected from the group consisting of dicyclopentyldimethoxysilane, methylcyclohexyldimethoxysilane, and n-propyltrimethoxysilane.

7. A polymerization process comprising contacting propylene or a mixture of propylene and one or more copolymerizable comonomers under polymerization conditions at a temperature from 40 to 130° C. with a catalyst composition comprising one or more Ziegler-Natta procatalyst compositions comprising one or more transition metal compounds and one or more esters of aromatic dicarboxylic acid internal electron donors; one or more aluminum containing cocatalyts; and an SCA mixture of two or more different selectivity control agents, said SCA mixture comprising from 1 to 99 mol percent of one or more esters of one or more aromatic monocarboxylic acids or substituted derivatives thereof, and from 99 to 1 mol percent of one or more alkoxysilane compounds, said compounds and amounts being selected such that:

$$\frac{A_{T2}(\text{mixture})}{A_{T1}(\text{mixture})} < \frac{A_{T2}(\text{Si})}{A_{T1}(\text{Si})}$$

where $A_{T2}$(mixture) and $A_{T1}$(mixture) are normalized catalyst activities using the SCA mixture at temperatures T2 and T1, respectively; $A_{T2}$(Si) and $A_{T1}$(Si) are normalized catalyst activities using only the alkoxysilane SCA compound at temperatures T2 and T1, respectively; T1 is a normal polymerization temperature from 50 to 85° C.; and T2 is a polymerization temperature higher than T1 possibly encountered during the polymerization under nonstandard polymerization conditions, from 85 to 130° C.

8. A process according to embodiment 7 wherein the procatalyst additionally comprises one or more esters of one or more aromatic monocarboxylic acids or substituted derivatives thereof and an aluminum alkyl compound and the catalyst composition is prepared by combining the same with one or more alkoxysilanes, optionally in combination with additional quantities of one or more monocarboxylic acid ester(s) and/or one or more cocatalysts.

9. A process according to any embodiment 7 which is a gas phase polymerization process.

10. A process according to any one of embodiments 7-9 which is conducted in more than one reactor operating in series.

The invention is further illustrated by the following examples that should not be regarded as limiting of the present invention. Unless stated to the contrary or conventional in the art, all parts and percents are based on weight. The term "mixed alkanes" refers to a commercially obtained mixture of $C_{6-9}$ aliphatic hydrocarbons, Isopar E®, available from Exxon Chemicals Inc. All solvents are dried prior to use.

EXAMPLE 1

A titanium containing Ziegler-Natta catalyst composition is employed to produce polypropylene homopolymers. The catalyst composition includes a procatalyst compound prepared by slurrying a mixture of a magnesium diethoxide and titanium ethoxide/chloride containing precursor corresponding to the formula $Mg_3Ti(OC_2H_5)_8Cl_2$ (made substantially according to U.S. Pat. No. 5,077,357) with diisobutylphthalate (0.2 liter/kilogram precursor) in a 50/50 (vol/vol) mixture of $TiCl_4$/monochlorobenzene (MCB, 19 liters/kilogram precursor). After the mixture is heated at 113° C. for 60 minutes, it is filtered. The resulting moist mass is slurried in a 50/50 $TiCl_4$/MCB mixture (19 liters/kilogram precursor) at 113° C. for 30 minutes, filtered, and the process repeated once more. The resulting solid is rinsed with isopentane and then dried with flowing warm nitrogen. The resulting procatalyst containing 2.6 percent Ti is ground and sieved prior to use in polymerizations.

Propylene polymerizations were carried out in a 48 cell automated, combinatorial multireactor (available from Symyx Technologies, Inc., and operated substantially according to U.S. Pat. No. 6,306,658). Reactor conditions employed are: an initial charge of 70 kPa (10 psig) $H_2$, propylene supplied continuously during the polymerization to provide a total reactor pressure of 0.7 MPa (100 psig), 110 µl of a 0.20M solution of triethylaluminum (TEA) in mixed alkanes (calculated to provide an Al/Ti molar ratio of 500/1), 4515 µl of mixed alkanes, 132 µl of a 0.01 M solution of SCA mixture in mixed alkanes (calculated to give a SCA/Ti ratio of 30/1) followed by 500 µl of mixed alkanes, and 275 µl of toluene slurry of the procatalyst, followed by 500 µl of mixed alkanes. Polymerization is terminated by addition of $CO_2$ at the end of 3600 seconds or upon sensing a preset propylene flow limit of approximately 150 percent of initial charge. Upon completion of polymerization, the reactors are vented to ambient pressure; the glass vials containing polymer are removed and devolatilized in a rotary evaporator at 25° C. for 16 hours. The polymer yields are determined by difference from the weights of the vials before and after polymerization and devolatilization.

The SCA mixtures tested include: dicyclopentyldimethoxysilane (DCPDMS)/PEEB, methylcyclohexyldimethoxysilane (MChDMS)/PEEB, MChDMS/ethylbenzoate (EB), and n-propyltrimethoxysilane (NPTMS)/PEEB. Normalized activity (A) for the various SCA combinations, amounts and temperatures are provided in Table 1. The ratios of normalized activity to activity at 67° C., $A/A_{67}$, are also provided to illustrate the change in relative activity as temperature increases. All results are the average of from two to four individual polymerizations, excepting run 24, which is based on a single polymerization.

TABLE 1

Polymerization Results

| Run | SCA mixture | Silane/Ester (mol percent) | Temp. (° C.) | Normalized Activity (kg/g cat.) | $A/A_{67}$ (percent) |
|---|---|---|---|---|---|
| 1 | DCPDMS/PEEB | 2/98 | 67 | 3.96 | 100 |
| 2 | " | " | 100 | 3.49 | 88 |
| 4 | " | 100/0 | 67 | 4.71 | 100 |
| 5 | " | " | 100 | 5.28 | 112 |
| 6 | MChDMS/PEEB | 2/98 | 67 | 2.94 | 100 |
| 7 | " | " | 100 | 1.51 | 51 |
| 8 | " | " | 115 | 0.65 | 22 |
| 9 | " | 5/95 | 67 | 3.16 | 100 |
| 10 | " | " | 100 | 1.10 | 35 |
| 11 | " | " | 115 | 0.88 | 28 |
| 12 | " | 100/0 | 67 | 3.58 | 100 |
| 13 | " | " | 100 | 4.09 | 114 |
| 14 | " | " | 115 | 2.27 | 63 |
| 15 | MChDMS/EB | 4/96 | 67 | 3.16 | 100 |
| 16 | " | " | 100 | 1.06 | 33 |
| 17 | " | " | 115 | 0.79 | 25 |
| 18 | " | 100/0 | 67 | 3.58 | 100 |
| 19 | " | " | 100 | 4.09 | 114 |
| 20 | " | " | 115 | 2.27 | 63 |
| 22 | NPTMS/PEEB | 2/98 | 67 | 2.50 | 100 |
| 22 | " | " | 100 | 1.27 | 51 |
| 23 | " | " | 130 | 0.60 | 24 |
| 24 | " | 10/90 | 67 | 2.15 | 100 |
| 25 | " | " | 100 | 1.25 | 58 |
| 26 | " | " | 130 | 0.60 | 28 |
| 27 | " | 15/85 | 67 | 2.12 | 100 |
| 28 | " | " | 100 | 1.25 | 59 |
| 29 | " | " | 130 | 0.54 | 25 |
| 30 | " | 50/50 | 67 | 2.34 | 100 |
| 31 | " | " | 100 | 1.31 | 56 |
| 32 | " | " | 130 | 0.62 | 26 |
| 33 | " | 100/0 | 67 | 2.95 | 100 |
| 34 | " | " | 100 | 6.27 | 213 |
| 35 | " | " | 130 | 0.51 | 17 |

As may be seen by reference to the results of Table 1, by using certain mixtures of SCA's according to the invention, reduced polymerization activity (normalized) may be obtained at elevated polymerization temperatures, compared to use of the silane SCA compound alone or compared to the use of the same SCA mixture at a lower polymerization temperature. The reduction may be controlled by adjusting the quantities of silane and secondary SCA employed, so that normalized activity levels substantially less than those obtainable by use of the silane SCA alone or less than the activity with the same SCA mixture at 67° C. are obtainable. Those illustrated compositions possess self-limiting polymerization properties. Accordingly, use of such SCA mixtures can reduce or avoid an uncontrolled acceleration of the reaction, as well as softening or melting of polymer particles that leads to agglomerate formation and sheeting or fouling of the reactor.

The invention claimed is:

1. A catalyst composition for the polymerization of propylene or mixtures of propylene and one or more copolymerizable comonomers, said catalyst composition comprising:

one or more Ziegler-Natta procatalyst compositions comprising one or more transition metal compounds and one or more esters of aromatic dicarboxylic acid internal electron donors;
one or more aluminum containing cocatalysts; and
an SCA mixture of two or more different selectivity control agents, said SCA mixture comprising from 1 to 99 mol percent of ethyl p-ethoxybenzoate, and from 99 to 1 mol percent of dicyclopentyldimethoxysilane, said compounds and amounts being selected such that:

$$\frac{A_{T2}(\text{mixture})}{A_{T1}(\text{mixture})} < \frac{A_{T2}(\text{Si})}{A_{T1}(\text{Si})}$$

where $A_{T2}$(mixture) and $A_{T1}$(mixture) are normalized catalyst activities using the SCA mixture at temperatures T2 and T1, respectively; $A_{T2}$(Si) and $A_{T1}$(Si) are normalized catalyst activities using only the alkoxysilane SCA compound at temperatures T2 and T1, respectively; T1 is a normal polymerization temperature from 50 to 85° C.; and T2 is a polymerization temperature higher than T1 possibly encountered during the polymerization under nonstandard polymerization conditions from 85 to 130° C.

2. The catalyst composition according to claim 1 wherein the total quantity of selectivity control agent employed is limited to provide a molar ratio, based on transition metal, from 1 to 500.

3. The catalyst composition according to claim 1 wherein the SCA mixture comprises from 80 to 99 percent of ethyl p-ethoxybenzoate, and from 20 to 1 percent of dicyclopentyldimethoxysilane.

4. The catalyst composition according to claim 1 wherein the SCA mixture comprises from 90 to 99 percent of ethyl p-ethoxybenzoate, and from 10 to 1 percent of dicyclopentyldimethoxysilane.

5. A polymerization process comprising:
contacting propylene or a mixture of propylene and one or more copolymerizable comonomers under polymerization conditions at a temperature from 40 to 130° C. with a catalyst composition comprising one or more Ziegler-Natta procatalyst compositions comprising one or more transition metal compounds and one or more esters of aromatic dicarboxylic acid internal electron donors, one or more aluminum containing cocatalysts, and an SCA mixture of two or more different selectivity control agents, said SCA mixture comprising from 1 to 99 mol percent of ethyl p-ethoxybenzoate, and from 99 to 1 mol percent of dicyclopentyldimethoxysilane, said compounds and amounts being selected such that:

$$\frac{A_{T2}(\text{mixture})}{A_{T1}(\text{mixture})} < \frac{A_{T2}(\text{Si})}{A_{T1}(\text{Si})}$$

where $A_{T2}$(mixture) and $A_{T1}$(mixture) are normalized catalyst activities using the SCA mixture at temperatures T2 and T1, respectively; $A_{T2}$(Si) and $A_{T1}$(Si) are normalized catalyst activities using only the alkoxysilane SCA compound at temperatures T2 and T1, respectively; T1 is a normal polymerization temperature from 50 to 85° C.; and T2 is a polymerization temperature higher than T1 possibly encountered during the polymerization under nonstandard polymerization conditions from 85 to 130° C.

6. The process according to claim 5 wherein the procatalyst additionally comprises one or more esters of one or more aromatic monocarboxylic acids or substituted derivatives thereof and an aluminum alkyl compound and the catalyst composition is prepared by combining the same with one or more alkoxysilanes, optionally in combination with additional quantities of one or more monocarboxylic acid ester(s) and/or one or more cocatalysts.

7. The process according to claim 5 which is a gas phase polymerization process.

8. The process according to claim 5 which is conducted in more than one reactor operating in series.

9. The catalyst composition according to claim 1 comprising from 95 to 99 mol percent of ethyl p-ethoxybenzoate, and from 5 to 1 mol percent of dicyclopentyldimethoxysilane.

10. The catalyst composition according to claim 1 comprising 98 mol percent ethyl p-ethoxybenzoate and 2 mol percent dicyclopentyldimethoxysilane.

11. The catalyst composition according to claim 1 wherein the total molar quantity of SCA mixture based on moles of transition metal is from 10 to 50.

12. The catalyst composition according to claim 1 wherein the molar ratio of aluminum to transition metal compound is 1-100:1.

13. The catalyst composition according to claim 1 wherein the molar ratio of SCA mixture to transition metal compound is 5-100:1.

14. The catalyst composition according to claim 1 wherein the SCA mixture comprises from 80 to 99 percent of ethyl p-ethoxybenzoate and from 20 to 1 percent of dicyclopentyldimethoxysilane and the molar ratio of aluminum to transition metal compound is 1-100:1.

15. The catalyst composition according to claim 1 wherein the wherein the SCA mixture comprises from 80 to 99 percent of ethyl p-ethoxybenzoate and from 20 to 1 percent of dicyclopentyldimethoxysilane and the molar ratio of SCA mixture to transition metal compound is 5-100:1.

16. The catalyst composition according to claim 1 wherein the SCA mixture comprises from 80 to 99 percent of ethyl p-ethoxybenzoate and from 20 to 1 percent of dicyclopentyldimethoxysilane, the molar ratio of aluminum to transition metal compound is 1-100:1, and the molar ratio of SCA mixture to transition metal compound is 5-100:1.

* * * * *